United States Patent
Mühlebach et al.

(12) 
(10) Patent No.: US 8,623,459 B2
(45) Date of Patent: Jan. 7, 2014

(54) SUBSTRATES WITH BIOPASSIVE COATING

(75) Inventors: Andreas Mühlebach, Frick (CH); Erich Nyfeler, Zollikofen (CH); Stephan Ilg, Giebenach (CH); Pascal Hayoz, Hofstetten (CH); Jens Möller, Zürich (CH)

(73) Assignee: BASF SE, Ludwigshafen (DE)

( * ) Notice: Subject to any disclaimer, the term of this patent is extended or adjusted under 35 U.S.C. 154(b) by 545 days.

(21) Appl. No.: 12/595,969

(22) PCT Filed: Apr. 11, 2008

(86) PCT No.: PCT/EP2008/054413
§ 371 (c)(1),
(2), (4) Date: Dec. 7, 2009

(87) PCT Pub. No.: WO2008/132037
PCT Pub. Date: Nov. 6, 2008

(65) Prior Publication Data
US 2010/0112364 A1    May 6, 2010

(30) Foreign Application Priority Data

Apr. 25, 2007 (EP) .................................. 07106900

(51) Int. Cl.
*B05D 3/00* (2006.01)
*B05D 3/02* (2006.01)
*B32B 27/08* (2006.01)

(52) U.S. Cl.
USPC ......... 427/299; 427/372.2; 427/532; 428/516

(58) Field of Classification Search
USPC ................. 427/299, 372.2, 532; 428/516
See application file for complete search history.

(56) References Cited

U.S. PATENT DOCUMENTS

| 2003/0129322 A1* | 7/2003 | Kunz et al. | 427/535 |
| 2008/0020127 A1* | 1/2008 | Whiteford et al. | 427/2.1 |
| 2008/0075960 A1* | 3/2008 | Pocius et al. | 428/446 |

FOREIGN PATENT DOCUMENTS

| JP | 05-269181 | 10/1993 |
| WO | 01/58971 A2 | 8/2001 |
| WO | WO 2005014874 A1 * | 2/2005 |

OTHER PUBLICATIONS

A. Goto & T. Fukuda, Effects of Radical Initiator on Polymerization Rate and Polydispersity in Nitroxide-Controlled Free Radical Polymerizatio, Macromolecules, 1997, 30, 4272-4277.*

* cited by examiner

*Primary Examiner* — Michael Cleveland
*Assistant Examiner* — James M Mellott
(74) *Attorney, Agent, or Firm* — Shiela A. Loggins

(57) ABSTRACT

The present invention provides a process for imparting decreased adhesion of biological material to the surface of a substrate comprises the following steps (i) oxidizing the surface of the substrate (ii) applying a composition comprising one or more ethylenically unsaturated compounds to the oxidized surface of the substrate and (iii) curing the composition in order to form a coating layer.

13 Claims, No Drawings

SUBSTRATES WITH BIOPASSIVE COATING

The present invention refers to a process for imparting decreased adhesion of biological material to the surface of a substrate, to processes for coating a substrate and to a mixture of compounds suitable for use in the mentioned processes.

Substrates can be treated with biocides in order to protect the substrate from biological infestation and growth. The undesirable accumulation of biological materials such as plants, algae or microorganisms on the surface of the substrate is usually referred to as biological fouling. Common antifouling agents are tetrabutyl tin (TBT) or phenyl mercuric acetate. The antifouling agents leak into the environment and thus contaminate the environment. The leakage of these biocides can cause resistancies among the target organisms, and as the antifouling agents are usually also highly toxic to not target organisms such as human beings and other mammals, undesired harm to these organisms can not be excluded.

Thus, it is an object of the present invention to provide a process for protecting substrates from biological infestation and growth without the need of common antifouling agents. The process shall also be technically feasible in large volumes and in a continuous mode on existing equipment.

This object is solved by the processes of, the substrate and the mixture of described in this application.

The process of the present invention for imparting decreased adhesion of biological material to the surface of a substrate comprises the following steps
(i) oxidizing the surface of the substrate
(ii) applying a composition comprising one or more ethylenically unsaturated compounds to the oxidized surface of the substrate and
(iii) curing the composition in order to form a coating layer.

Biological material can be proteins, spores, nucleic acids, viruses or biological cells as well as fragments or extracts of biological cells.

Examples of proteins are fibrous proteins such as actin and tubulin, globular proteins such as albumin, fibrin, thrombin and immunoglobulin, enzymes such as oxidoreductases, transferases and hydrolases, and prions.

Examples of spores are spores of fungi, ferns and fern allies.

Examples of nucleic acids are deoxyribonucleic acid and ribonucleic acid.

Examples of viruses are adenovirus, AIDS virus, lambda phage, T4 phage and T7 phage.

Examples of biological cells are archaea, bacterial cells or eukaryotic cells.

Examples of bacterials cells are cells from the phyla Actinobacteria, Chlamydia, Cyanobacteria, Firmicutes, Proteobacteria and Spirochaetes. Examples of genera of the phylum Actinobacteria are *Actinomyces, Arthrobacter, Corynebacterium, Nocardia* and *Streptomyces*. Examples of genera of the phylum Firmicutes are *Bacillus, Enterococcus, Lactobacillus, Lactococcus, Streptococcus, Acetobacterium, Clostridium, Eubactrium* and *Heliobacterium*. Examples of genera of the phylum Proteobacteria are *Enterobacter, Escherichia, Klebsiella, Salmonella, Pseudomonas, Vibrio, Burkholdria, Helicobacter* and *Campylobacter*. Cells of the species *Escherichia coli* are particular preferred bacterial cells.

Examples of eukaryotic cells are fungal cells, human cells, animal cells and plant cells.

Examples of fungal cells are molds, mushrooms and yeast cells. Examples of yeast cells are cells of generae *Saccharomyces* and *Candida*. Cells of the species *Saccharomyces cerevisae* and *Candida albicans* are particular preferred yeast cells.

Preferred biological materials are proteins, bacterial cells and biological cells. More preferred biological materials are proteins, bacterial cells and fungal cells. Most preferred biological material are bacterial cells, in particular those of *Escherichia coli*.

The degree of adhesion of biological matter to the surface of the substrate can be determined by comparing the amount of biological material adhered to the surface of substrates treated according to the process of the present invention to the amount of biological material adhered to the surface of the untreated substrates.

The substrate can be a two-dimensional object such as a sheet or a film, or any three dimensional object; it can be transparent or opaque. The substrate can be made from paper, cardboard, wood, leather, metal, textiles, glass, ceramics, stone and/or polymers.

Examples of metals are iron, nickel, palladium platin, copper, silver, gold, zinc and aluminium and alloys such as steel, brass, bronze and duralumin.

Textiles can be made from natural fibres such as fibres from animal or plant origin, or from synthetic fibres. Examples of natural fibres from animal origin are wool and silk. Examples of natural fibres from plant origin are cotton, flax and jute. Examples of synthetic textiles are polyester, polyacrylamide, polyolefins such as polyethylene and polypropylene and polyamides such as nylon and lycra.

Examples of ceramics are products made primarily from clay, for example bricks, tiles and porcelain, as well as technical ceramics. Technical ceramics can be oxides such as aluminium oxide, zirconium dioxide, titanium oxide and barium titanate, carbides such as sodium, silicon or boron carbide, borides such as titanium boride, nitrides such as titanium or boron nitride and silicides such as sodium or titanium silicide.

Examples of stones are limestone, granite, gneiss, marble, slate and sandstone.

Examples of polymers are acrylic polymers, styrene polymers and hydrogenated products thereof, vinyl polymers and derivatives thereof, polyolefins and hydrogenated or epoxidized products thereof, aldehyde polymers, epoxide polymers, polyamides, polyesters, polyurethanes, polycarbonates, sulfone-based polymers and natural polymers and derivatives thereof.

Acrylic polymers can be polymers formed from at least one acrylic monomer or from at least one acrylic monomer and at least one other ethylenically unsaturated monomer such as a styrene monomer, vinyl monomer, olefin monomer or maleic monomer.

Examples of acrylic monomers are (meth)acrylic acid, (meth)acrylamide, (meth)acrylonitrile, ethyl (meth)acrylate, butyl (meth)acrylate, hexyl (meth)acrylate, 2-ethylhexyl (meth)acrylate, glycidyl methacrylate, acetoacetoxyethyl methacrylate, dimethylaminoethyl acrylate and diethylaminoethyl acrylate. Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluroethylene. Examples of maleic monomers are maleic acid, maleic anhydride and maleimide.

Examples of acrylic polymers are poly(methyl methacrylate) (PMMA), poly(butyl methacrylate), polyacrylonitrile (PAN), polyacrylic acid, styrene/2-ethylhexyl acrylate copolymer, styrene/acrylic acid copolymer.

Styrene polymers can be polymers formed from at least one styrene monomer or from at least one styrene monomer and at least one vinyl monomer, olefin monomer and/or maleic monomer. Examples of styrene polymers are polystyrene (PS), styrene butadiene styrene block polymers, styrene ethylene butadiene block polymers, styrene ethylene propylene styrene block polymers and styrene-maleic anhydride copolymers.

Vinyl polymers can be polymers formed from at least one vinyl monomer or from at least one vinyl monomer and at least one olefin monomer or maleic monomer. Examples of vinyl polymers are polyvinyl chloride (PVC), polyvinylidenfluoride (PVDF), polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Polyolefins can be polymers formed from at least one olefin monomer or from at least one olefin monomer and maleic monomer. Examples of polyolefines are low-density polyethylene (LDPE), high-density polyethylene (HDPE), polypropylene (PP), biaxially orientated polypropylene (BOPP), polybutadiene, polytetrafluoroethylene (Teflon-PTFE), chlorinated polyethylene and isopropylene-maleic anhydride copolymer.

Aldehyde polymers can be polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of a polyalcohol is polyvinyl alcohol. Examples of amine monomers are aniline and melamine. Examples of urea monomers are urea, thiurea and dicyandiamide. An example of an aldehyde polymer is polyvinyl butyral formed from butyral and polyvinylalcohol.

Epoxide polymers can be polymers formed from at least one epoxide monomer and at least one alcohol monomer and/or amine monomer. Examples of epoxide monomers are epichlorohydrine and glycidol. Examples of alcohol monomers are phenol, cresol, resorcinol, xylenol, bisphenol A and glycol. An example of epoxide polymer is phenoxy resin, which is formed from epichlorihydrin and bisphenol A.

Polyamides can be polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalene-dicarboxylic acid. Examples of polyamides are polyhexamethylene adipamide and polycaprolactam.

Polyesters can be polymers formed from at least one monomer having a hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is carprolactone. Examples of dicarboxylic acids are terephthalic acid, isophthalic acid and 1,4-naphthalenedicarboxylic acid. An example of a polyester is polyethylene terephthalate (PET). So-called alkyd resins are also regarded to belong to polyester polymers.

Polyurethane can be polymers formed from at least one diisocyanate monomer and at least one polyol monomer and/or polyamine monomer. Examples of diisocyanate monomers are hexamethylene diisocyanate, toluene diisiocyanate, isophorone diisocyanate and diphenylmethane diisocyanate.

Examples of polycarbonates are poly(aromatic carbonates) and poly(aliphatic carbonates). Poly(aliphatic carbonates) can be formed from carbon dioxide and at least one epoxide.

Examples of sulfone-based polymers are polyarylsulfone, polyethersulfone (PES), poly-phenylsulfone (PPS) and polysulfone (PSF). Polysulfone (PSF) is a polymer formed from 4,4-dichlorodiphenyl sulfone and bisphenol A.

Examples of natural polymers are starch, cellulose, gelatine, caesin and natural rubber. Examples of derivatives are oxidised starch, starch-vinyl acetate graft copolymers, hydroxyethyl cellulose, hydroxypropyl cellulose, methyl cellulose, nitryl cellulose, ethyl cellulose, carboxymethyl cellulose and acetyl cellulose.

The substrate can be a substrate used in the medicinal field. Examples of such substrates are substrates which are used in-vivo such as implants, artificial organs, artificial joints, artificial blood vessels and medicinal devices such as wound care bandages, catheters, stethoscopes, tubes, syringes and needles.

The substrate can be a water liner or packaging, for example food packaging. The substrate could also be a membrane.

Preferably, the substrate is made from polymer. More preferably, the substrate is made from polymer selected from the group consisting of styrene polymers, vinyl polymers and derivatives thereof, polyolefins, polyesters and sulfone-based polymers. Even more preferably, the substrate is made from polyolefins. Most preferably, the substrate is made from polypropylene (PP) or a biaxially orientated polypropylene (BOPP).

Preferably, the substrate made from polymer is a film.

The oxidation of the surface of the substrate can be performed, for example, by treatment with corona discharge, plasma, flame, ozone, electron-beam, X-ray or ultraviolet radiation.

Corona discharges can be electrical discharges characterized by a corona and occurring when one of two electrodes in a gas has a shape causing the electric field at its surface to be significantly greater than that between the electrodes. Air is usually used as gas. The substrate is usually located at ambient pressure in the discharge field between the two electrodes, for example by passing a film as substrate between two electrodes.

Plasma can be a gas where electrons and ions are present. Plasma can be generated by the treatment of gases with high temperatures or high electric fields. Plasma treatment is usually carried out in vacuum chambers at 10 to 100 Pa with a nonthermal plasma in a gas atmosphere consisting of an inert gas or reactive gas, for example oxygen.

Flame can be flames that are formed when a flammable gas and an oxygen containing gas, for example atmospheric air, are combined and combusted. Examples of flammable gases are propane, butane or town gas. Flame treatment is usually carried out at ambient pressure.

Ozone can be generated from atmospheric oxygen in a corona discharge or by ultraviolet radiation.

Electron beam can be generated by electron beam accelerators, for example by cathode ray tubes.

X-rays can be generated by X-ray generators, for example by X-ray-tubes.

Preferably, the oxidation of the surface is performed by treatment with corona discharge, plasma or flame. More preferably, it is performed by corona discharge treatment or plasma treatment.

The one or more ethylenically unsaturated compounds can be any ethylenically unsaturated compounds capable of polymerization.

The one or more ethylenically unsaturated compounds, for example, can be of formula

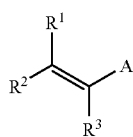

(1)

wherein
$R^1$, $R^2$ and $R^3$ can the same or different and can be hydrogen, halogen or $C_{1-6}$-alkyl, A can be aryl, halogen, CN, $C(O)R^4$, $C(O)OR^5$, $OR^6$, $OC(O)R^7$, $NR^8C(O)R^9$ or $C(O)NR^{10}R^{11}$, wherein aryl can be unsubstituted or substituted as outlined below,
wherein
$R^4$, $R^5$, $R^6$, $R^7$, $R^{10}$ and $R^{11}$ can be the same or different and can be hydrogen, $C_{1-100}$-alkyl, $C_{3-8}$-cycloalkyl, $C_{2-30}$-alkenyl, aryl, $C_{1-6}$-alkylene-aryl-$C_{1-6}$-alkyl, $C_{1-6}$-alkylene-aryl-$(C_{1-6}$-alkyl$)_2$, $C_{1-6}$-alkylene-$C_{1-12}$-cycloalkyl-$C_{1-6}$-alkyl, $C_{1-6}$-alkylene-$C_{1-12}$-cycloalkyl-$(C_{1-6}$-alkyl$)_2$ or aryl-$C_{1-30}$-alkylene-aryl, and $R^8$ and $R^9$ can be the same or different and can have the same meaning as $R^5$, and in addition, together with NC(O) can form a four to seven membered cycle,
wherein
$C_{1-100}$-alkyl, $C_{1-6}$-alkylene-aryl-$C_{1-6}$-alkyl, $C_{1-6}$-alkylene-aryl-$(C_{1-6}$-alkyl$)_2$, $C_{1-6}$-alkylene-$C_{1-12}$-cycloalkyl-$C_{1-6}$-alkyl and $C_{1-6}$-alkylene-$C_{1-12}$-cycloalkyl-$(C_{1-6}$-alkyl$)_2$ can be unsubstituted or substituted with one or more $C_{3-8}$-cycloalkyl, aryl, $OC_{2-30}$-alkenyl, halogen, CN, $C(O)OR^{12}$, $C(O)NR^{13}R^{14}$, $OR^{15}$, $NR^{16}R^{17}$, $NHC(O)C(R^{18})=C(R^{19})R^{20}$, $OC(O)C(R^{21})=C(R^{22})R^{23}$ or $C(O)OC(R^{24})=C(R^{25})R^{26}$;

$C_{2-30}$-alkenyl group can be unsubstituted or substituted with one or more $C_{3-8}$-cycloalkyl, aryl, halogen, CN, $C(O)OR^{12}$, $C(O)NR^{13}R^{14}$, $OR^{15}$, $NR^{16}R^{17}$, $NHC(O)C(R^{18})=C(R^{19})R^{20}$, $OC(O)C(R^{21})=C(R^{22})R^{23}$ or $C(O)OC(R^{24})=C(R^{25})R^{26}$, aryl or aryl-$C_{1-30}$-alkylene-aryl group can be unsubstituted or substituted with one or more $C_{1-6}$-alkyl, $C_{3-8}$-cycloalkyl, $C_{2-30}$-alkenyl, halogen, CN, $C(O)OR^{12}$, $C(O)NR^{13}R^{14}$, $OR^{15}$, $NR^{16}R^{17}$, $NHC(O)C(R^{18})=C(R^{19})R^{20}$, $OC(O)C(R^{21})=C(R^{22})R^{23}$ or $C(O)OC(R^{24})=C(R^{25})R^{26}$, wherein
$R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ and $R^{26}$ can be the same or different and can be hydrogen or $C_{1-6}$-alkyl,
and
one or more $CH_2$-groups of $C_{1-100}$-alkyl or $C_{2-30}$-alkenyl can be replaced with —O—, —NH— and/or phenylene, and one $CH_2$-group of $C_{3-8}$-cycloalkyl can be replaced with —O—.

Halogen can be fluorine, chlorine, bromine or iodine. $C_{1-6}$-alkyl can be methyl, ethyl, propyl, isopropyl, butyl, isobutyl, sec-butyl, tert-butyl, pentyl or hexyl.

An example of $C_{1-6}$-alkylene-aryl-$(C_{1-6}$-alkyl$)_2$ is triethyl isocyanurate. An example of $C_{1-6}$-alkylene-$C_{1-12}$-cycloalkyl-$C_{1-6}$-alkyl is dimethyl tricyclodecane.

Aryl can be phenyl or naphthyl or heteroaryl such as imidazyl, pyrryl or isocyanuryl. Preferably, aryl is phenyl.

$C_{1-6}$-alkyl can be branched or unbranched and can be methyl, ethyl, propyl, isopropyl, butyl, isobutyl, sec-butyl, tert-butyl, pentyl or hexyl.

$C_{1-100}$-alkyl can be branched or unbranched. Examples of $C_{1-100}$-alkyl are methyl, ethyl, propyl, isopropyl, butyl, isobutyl, sec-butyl, tert-butyl, pentyl, hexyl, heptyl, octyl, nonyl, decyl, undecyl, dodecyl, tetradecyl, pentadecyl, hexadecyl, octadecyl, icosyl, eicosyl, docosyl, tetracosyl and triacontyl.

Examples $C_{3-8}$-cycloalkyl are cyclopropyl, cyclobutyl, cyclopentyl, cyclohexyl, cycloheptyl and cyclooctyl.

Examples of $C_{2-30}$-alkenyl are vinyl and allyl.

Examples of aryl-$C_{1-30}$-alkylene-aryl are phenyl-ethylene-phenyl and phenyl-propylene-phenyl.

Examples of ethylenically unsaturated compounds of formula 1 are methyl acrylate, ethyl acrylate, butyl acrylate, 2-ethylhexyl acrylate, 2-hydroxyethyl acrylate, glycidyl methacrylate, methyl methacrylate, ethyl methacrylate, acrylonitrile, acrylamide, methacrylic acid, methacrylamide, vinyl acetate, isobutyl vinyl ether, styrene, N-vinylpyrrolidinone, vinyl chloride, vinylidene chloride, ethylene glycol diacrylate, hexamethylene glycol diacrylate, propylene glycol diacrylate, dipropylene glycol diacrylate, tripropylene glycol diacrylate, neopentyl glycol diacrylate, bisphenol A diacrylate, tricyclodecane dimethanol diacrytate, 4,4'-bis(2-acryloyloxyethoxy)diphenylpropane, vinyl acrylate, vinyl methacrylate, divinybenzene, divinyl succinate, ethylenegly-coldivinylether, diethyleneglycoldivinylether, triethyleneg-lycoldivinylether, glycerol ethoxylate triacrylate, glycerol propoxylate triacrylate, trimethylolpropaneethoxylate triacrylate, trimethyolpropanepropoxylate triacrylate, pentaerythritol ethoxylate tetraacrylate, pentaerythritol propoxylate triacrylate, pentaerythritol propoxylate tetraacrylate, trimethylolpropane triacrylate, 2-hydroxyethyl isocyanurate triacrylate, ethoxylated (6) trimethylolpropane triacrylate, ethoxylated (9) trimethylolpropane triacrylate, ethoxylated (15) trimethylolpropane triacrylate, pentaerythritol triacrylate, pentaerythritol tetraacrylate, dipentaerythritol pentaacrylate, neopentyl glycol ethoxylate diacrylate and neopentyl glycol propoxylate diacrylate, polyethylene glycol (400) diacrylate, polyethylene glycol (400) dimethacrylate, polyethylene glycol (600) diacrylate, polyethylene glycol (600) dimethacrylate and polyethyleneglycol-mono-methacrylate.

Preferably, $R^1$, $R^2$ and $R^3$ are the same or different and are hydrogen or $C_{1-6}$-alkyl.

Preferably, A is aryl, halogen, CN, $C(O)OR^5$, $OR^6$, $OC(O)R^7$, $NR^8C(O)R^9$ or $C(O)NR^{10}R^{11}$, wherein $R^5$, $R^6$, $R^7$, $R^{10}$ and $R^{11}$ are hydrogen, $C_{1-100}$-alkyl, $C_{2-30}$-alkenyl or aryl-$C_{1-30}$-alkylene-aryl; $R^8$ and $R^9$ are the same or different and have the same meaning as $R^5$, and in addition, together with NC(O) can form a four to seven membered cycle, and wherein $C_{1-100}$-alkyl can be unsubstituted or substituted with one or more $C_{3-8}$-cycloalkyl, O—$C_{2-30}$-alkenyl, $OR^{15}$, $NR^{16}R^{17}$, $OC(O)C(R^{21})=C(R^{22})R^{23}$, $NHC(O)C(R^{18})=C(R^{19})R^{20}$ or $C(O)OC(R^{24})=C(R^{25})R^{26}$, and aryl can be unsubstituted or substituted with one or more $C_{2-30}$-alkenyl or $OC(O)C(R^{21})=C(R^{22})R^{23}$; $R^{15}$, $R^{16}$, $R^{17}$, $R^{21}$, $R^{22}$, $R^{23}$, $R^{24}$, $R^{25}$ and $R^{26}$ can be the same or different and are hydrogen or $C_{1-6}$-alkyl, and one or more $CH_2$-groups of $C_{1-100}$-alkyl or $C_{2-30}$-alkenyl can be replaced with —O—, —NH— and/or phenylene, and one $CH_2$-group of $C_{3-8}$-cycloalkyl can be replaced with —O—.

More preferably, A is C(O)OR$^5$, wherein R$^5$ is C$_{1-100}$-alkyl, wherein C$_{1-100}$-alkyl is substituted with one or more OC(O)C(R$^{21}$)=C(R$^{22}$)R$^{23}$, and one or more CH$_2$-groups of C$_{1-100}$-alkyl can be replaced with —O—.

Examples of preferred ethylenically unsaturated compounds of formula 1 are ethylene glycol diacrylate, hexamethylene glycol diacrylate, propylene glycol diacrylate, dipropylene glycol diacrylate, tripropylene glycol diacrylate, neopentyl glycol diacrylate, glycerol ethoxylate triacrylate, glycerol propoxylate triacrylate, trimethylolpropaneethoxylate triacrylate, trimethyolpropanepropoxylate triacrylate, pentaerythritol ethoxylate tetraacrylate, pentaerythritol propoxylate triacrylate, pentaerythritol propoxylate tetraacrylate, trimethylolpropane triacrylate, ethoxylated (6) trimethylolpropane triacrylate, ethoxylated (9) trimethylolpropane triacrylate, ethoxylated (15) trimethylolpropane triacrylate, pentaerythritol triacrylate, pentaerythritol tetraacrylate, dipentaerythritol pentaacrylate, neopentyl glycol ethoxylate diacrylate, neopentyl glycol propoxylate diacrylate, polyethylene glycol (400) diacrylate, polyethylene glycol (400) dimethacrylate, polyethylene glycol (600) diacrylate and polyethylene glycol (600) dimethacrylate.

These compounds are commercially available, for example, from Sartomer Company. Alternatively, polyethylene glycol (600) diacrylate and polyethylene glycol (600) dimethacrylate, for example, can be prepared by reacting polyethylene glycol (600) with methyl acrylate, respectively, methyl methacrylate.

Most preferably, A is C(O)OR$^5$, wherein R$^5$ is C$_{30-60}$-alkyl, wherein C$_{30-60}$-alkyl can be branched or unbranched and is substituted with one or more OC(O)C(R$^{21}$)=C(R$^{22}$)R$^{23}$, and one or more CH$_2$-groups of C$_{30-60}$-alkyl can be replaced with —O—.

Examples of especially preferred ethylenically unsaturated compounds of formula 1 are polyethylene glycol (600) diacrylate and polyethyleneglycol (600) dimethacrylate, ethoxylated (9) trimethylolpropane triacrylate and ethoxylated (15) trimethylolpropane triacrylate. Polyethylene glycol (600) diacrylate is the most preferred compound of formula 1.

The one or more ethylenically unsaturated compounds can also be an allyl radical, for example diallylphthalate, triallylphosphate and triallylisocyanurate.

The one or more ethylenically unsaturated compounds can also be a macromonomer capable of forming a polymer having at least five monomer units, which macromonomer has a molecular weight ranging from 1,000 to 1,000,000,000 g/mol and carries side chains having ethylenically unsaturated groups. Examples of macromonomers of this kind are (meth)acryloyl-modified polyvinyl alcohol, (meth)acryloyl-modified partially hydrolysed polyvinyl acetate, (meth)acryloyl-modified methyl vinyl ether-maleic anhydride copolymer, (meth)acryloyl-modified methyl isopropylene-maleic anhydride copolymer, (meth)acryloyl-modified polyurethane and (meth)acryloyl-modified cellulose.

The one or more ethylenically unsaturated compounds are preferably a compound of formula 1.

Preferably, the composition can also comprise a solvent.

The solvent can be water, an organic solvent or mixtures thereof.

Examples of organic solvents are C$_{1-4}$-alkanols, C$_{2-4}$-polyols, C$_{3-6}$-ketones, C$_{4-6}$-ethers, C$_{2-3}$-nitriles, nitromethane, dimethylsulfoxide, dimethylformamide, dimethylacetamide, N-methyl pyrolidone and sulfolane, whereby C$_{1-4}$-alkanols and C$_{2-4}$-polyols may be substituted with C$_{1-4}$-alkoxy. Examples of C$_{1-4}$-alkanols are methanol, ethanol, propanol, isopropanol, butanol, isobutanol, sec-butanol and tert-butanol. Examples of C$_{1-4}$-alkoxy-derivatives thereof are 2-ethoxyethanol and 1-methoxy-2-propanol. Examples of C$_{2-4}$-polyols are glycol and glycerol. Examples of C$_{3-6}$-ketones are acetone and methyl ethyl ketone. Examples of C$_{4-6}$-ethers are dimethoxyethane, diisopropylether and tetrahydrofurane. An example of a C$_{2-3}$-nitrile is acetonitrile. Preferably, the organic solvent is selected from the group consisting of C$_{1-4}$-alkanols, C$_{2-4}$-polyols, C$_{3-6}$-ketones, dimethylformamide and dimethylacetamide, whereby C$_{1-4}$-alkanols and C$_{2-4}$-polyols may be substituted with C$_{1-4}$-alkoxy. More preferably, the organic solvent is a C$_{1-4}$-alkanol.

Preferably, the solvent is water or a mixture of water and an organic solvent.

The composition can also comprise one or more radical initiators. The one or more radical initiators can be thermal initiators such as 2,2-azobisisobutyronitrile or photoinitiators. Preferably, the one or more radical initiators are photoinitiators.

The photoinitiator can be of formula

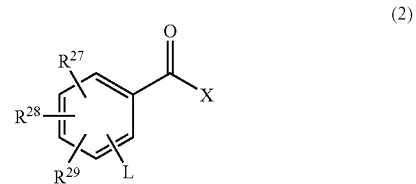

(2)

wherein

L can be hydrogen or

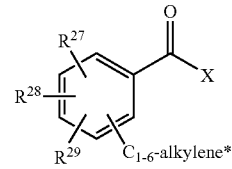

wherein C$_{1-6}$-alkylene can be unsubstituted or substituted with hydroxyl, and R$^{27}$, R$^{28}$ and R$^{29}$ can be the same or different and can be hydrogen, halogen, hydroxyl, C$_{1-6}$-alkyl, aryl, O—C$_{1-6}$-alkyl, O-aryl, S—C$_{1-6}$-alkyl, S-aryl or NR$^{30}$R$^{31}$, wherein R$^{30}$ and R$^{31}$ can be the same or different and can be hydrogen or C$_{1-6}$-alkyl, or together with the nitrogen form a five to seven membered cycle, wherein a CH$_2$ group of the cycle can be replaced with —O—, and C$_{1-6}$-alkyl, O—C$_{1-6}$-alkyl and S—C$_{1-6}$-alkyl can be unsubstituted or substituted with one or more hydroxyl, C$_{2-30}$-alkenyl, OC(O)C$_{2-30}$-alkenyl or aryl, and X can be

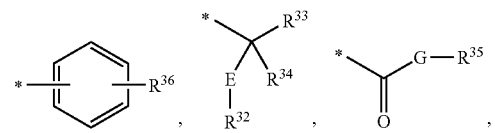

-continued

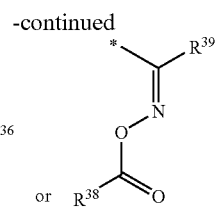

wherein E and G can be —O—, —S— or $NR^{40}$, wherein $R^{40}$ can be hydrogen or $C_{1-6}$-alkyl, or $R^{40}$ and $R^{32}$, respectively, $R^{35}$ can, together with the nitrogen, form a five to seven membered cycle, wherein a $CH_2$ group of the cycle can be replaced with —O—, NH, $NC(O)C(R^{41})$=$C(R^{42})R^{43}$ and/or

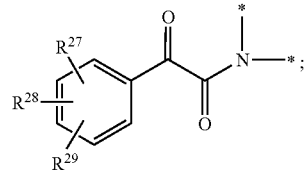

$R^{32}$, $R^{35}$ and $R^{39}$ can be the same or different and can be hydrogen, $C_{1-100}$-alkyl, $C_{3-8}$-cycloalkyl, $C_{2-30}$-alkenyl, aryl or $C(O)R^{44}$, $R^{36}$, $R^{37}$ and $R^{38}$ can be the same or different and can be hydrogen, $C_{1-100}$-alkyl, O—$C_{1-100}$-alkyl, S—$C_{1-100}$-alkyl, $NR^{45}C_{1-100}$-alkyl, $C_{3-8}$-cycloalkyl, $C_{2-30}$-alkenyl, aryl or $C(O)R^{44}$, wherein $R^{45}$ can have the same meaning as $R^{32}$ and $R^{44}$ can have the same meaning as $R^{36}$, $R^{33}$ and $R^{34}$ can have the same meaning as $R^{36}$ and in addition can, together with the linking carbon atom, form a five to seven membered cycle, $C_{1-100}$-alkyl and $C_{2-30}$-alkenyl can be unsubstituted or substituted with one or more $C_{3-8}$-cycloalkyl, aryl, halogen, amino, hydroxyl, CN, COOH, $C(O)R^{46}$, $C(O)OR^{47}$, $C(O)NR^{48}R^{49}$, $OR^{50}$, $OC(O)R^{51}$, $OC(O)C(R^{52})$=$C(R^{53})R^{54}$, $C(O)OC(R^{55})$=$C(R^{56})R^{57}$,

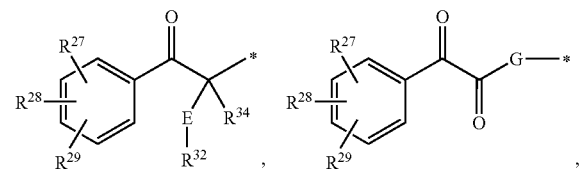

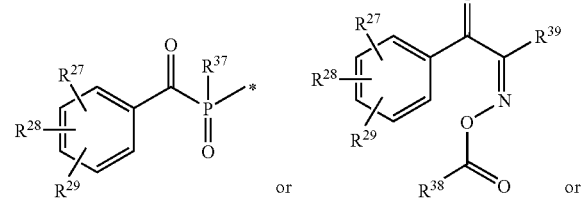

aryl can be unsubstituted or substituted with one or more $C_{1-4}$-alkyl, $C_{3-8}$-cycloalkyl, $C_{2-30}$-alkenyl, halogen, hydroxyl, CN, COOH, $C(O)R^{46}$, $C(O)OR^{47}$, $C(O)NR^{48}R^{49}$, $OR^{50}$, $OC(O)R^{51}$, $OC(O)C(R^{52})$=$C(R^{53})R^{54}$ or $C(O)OC(R^{55})$=$C(R^{56})R^{57}$;

wherein $R^{41}$, $R^{42}$, $R^{43}$, $R^{46}$, $R^{47}$, $R^{48}$, $R^{49}$, $R^{50}$, $R^{51}$, $R^{52}$, $R^{53}$, $R^{54}$, $R^{55}$, $R^{56}$ and $R^{57}$ can be the same or different and can be hydrogen or $C_{1-6}$-alkyl, and one or more $CH_2$-groups of $C_{1-100}$-alkyl or $C_{2-30}$-alkenyl can be replaced with —O—, —$NR^{40}$— and/or phenylene, and one $CH_2$-group of $C_{3-8}$-cycloalkyl can be replaced with —O—. Examples of $C_{1-6}$-alkylene are methylene, propylene and butylene.

Examples of photoinitiators of formula 2 are benzoin ethers such as benzoin ethyl ether, benzyl monoketals such as 2,2-diethoxy-1-phenylethanon and 2,2-diethoxy-1,2-diphenyl-ethanon, alpha-substituted acetophenone derivatives such as 2-hydroxy-2-methylpropio-phenone, 1-hydroxycyclohexyl phenyl ketone, 2-methyl-4'-(methylthio)-2-morpholino-propiophenone and 2-benzyl-2-(dimethylamino)-4'-morpholinobutyrophenone, acylphosphine oxides such as diphenyl(2,4,6-trimethylbenzoyl)-phosphine oxide or phenylbis(2,4,6-tri-methylbenzoyl)-phosphine oxide, alpha-acyloximester such as 1-[4-(phenylthio)phenyl]-2-(O-benzoyloxim)octan-1,2-dione, and phenylglyoxalic acid esters such as diethyleneglycol di(phenylglyoxylate), triethyleneglycol di(phenylglyoxylate), polyethylene glycol (150) di(phenylglyoxylate), polyethylene glycol (300) di(phenylglyoxylate), polyethylene glycol (400) di(phenylglyoxylate) and polyethylene glycol (600) di(phenylglyoxylate).

In preferred compounds of formula 2, $R^{27}$, $R^{28}$ and $R^{29}$ can be the same or different and are hydrogen, hydroxyl, $C_{1-6}$-alkyl, O—$C_{1-6}$-alkyl, S—$C_{1-6}$-alkyl, S-aryl or $NR^{30}R^{31}$, wherein $R^{30}$ and $R^{31}$ can be the same or different and can be hydrogen or $C_{1-6}$-alkyl, or together with the nitrogen form a five to seven membered cycle, wherein a $CH_2$ group of the cycle can be replaced with —O—, and $C_{1-6}$-alkyl and O—$C_{1-6}$-alkyl can be unsubstituted or substituted with one or more hydroxyl, $C_{2-30}$-alkenyl or aryl, and X is

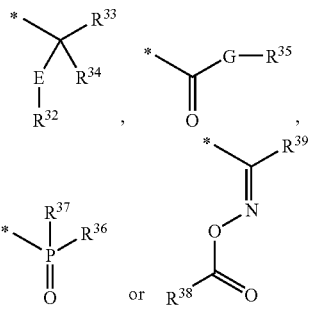

wherein E and G are —O— or $NR^{40}$, wherein $R^{40}$ can be hydrogen or $C_{1-6}$-alkyl, or $R^{40}$ and $R^{32}$, respectively, $R^{35}$ can, together with the nitrogen, form a five to seven membered cycle, wherein a $CH_2$ group of the cycle can be replaced with —O—, NH, $NC(O)C(R^{41})$=$C(R^{42})R^{43}$ and/or

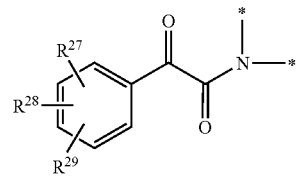

$R^{32}$, $R^{35}$ and $R^{39}$ can be the same or different and are hydrogen, $C_{1-100}$-alkyl, $C_{2-30}$-alkenyl, aryl or $C(O)R^{44}$; $R^{36}$, $R^{37}$ and $R^{38}$ can be the same or different and are hydrogen, $C_{1-100}$-alkyl, O—$C_{1-100}$-alkyl or $C(O)R^{44}$; $R^{33}$ and $R^{34}$ can have the same meaning as $R^{36}$ and in addition can, together with the linking carbon atom, form a five to seven membered cycle, $R^{44}$ has the same meaning as $R^{36}$, $C_{1-100}$-alkyl and $C_{2-30}$-alkenyl can be unsubstituted or substituted with one or more aryl, amino, hydroxyl, $OC(O)C(R^{52})=C(R^{53})R^{54}$, $C(O)OC(R^{55})=C(R^{56})R^{57}$,

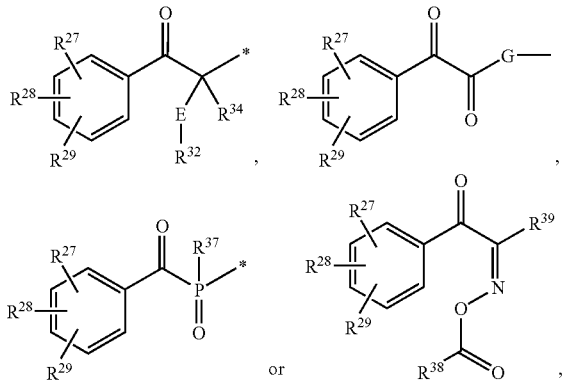

wherein $R^{41}$, $R^{42}$, $R^{43}$, $R^{52}$, $R^{53}$, $R^{54}$, $R^{55}$ and $R^{56}$ and $R^{57}$ can be the same or different and are hydrogen or $C_{1-6}$-alkyl, aryl can be unsubstituted or substituted with one or more $C_{1-4}$-alkyl, and one or more $CH_2$-groups of $C_{1-100}$-alkyl or $C_{2-30}$-alkenyl can be replaced with —O— and/or —$NR^{40}$—.

In more preferred compounds of formula 2, $R^{27}$, $R^{28}$ and $R^{29}$ can be the same or different and are hydrogen, hydroxyl, $C_{1-6}$-alkyl, O—$C_{1-6}$-alkyl, S—$C_{1-6}$-alkyl or $NR^{30}R^{31}$, wherein $R^{30}$ and $R^{31}$ can be the same or different and are hydrogen or $C_{1-6}$-alkyl; wherein $C_{1-6}$-alkyl and O—$C_{1-6}$-alkyl can be unsubstituted or substituted with one or more hydroxyl, $C_{2-30}$-alkenyl or aryl, and X is

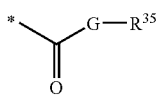

wherein G is —O— or $NR^{40}$, wherein $R^{40}$ can be hydrogen, or $R^{40}$ and $R^{35}$ can, together with the nitrogen, form a five to seven membered cycle, wherein a $CH_2$ group of the cycle can be replaced with NH, $NC(O)C(R^{41})=C(R^{42})R^{43}$ and/or

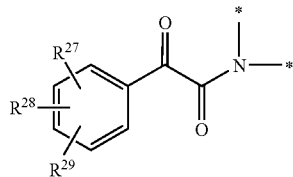

$R^{35}$ is hydrogen, $C_{1-100}$-alkyl or $C_{2-30}$-alkenyl, wherein $C_{1-100}$-alkyl and $C_{2-30}$-alkenyl can be unsubstituted or substituted with one or more amino, hydroxyl, $OC(O)C(R^{52})=C(R^{53})R^{54}$ and/or

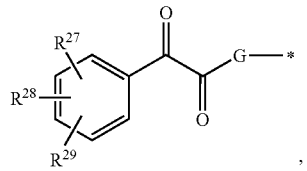

wherein $R^{41}$, $R^{42}$, $R^{43}$, $R^{52}$, $R^{53}$ and $R^{54}$ can be the same or different and are hydrogen or $C_{1-6}$-alkyl, and one or more $CH_2$-groups of $C_{1-100}$-alkyl or $C_{2-30}$-alkenyl can be replaced with —O— and/or —$NR^{40}$—.

In the most preferred compounds of formula 2, $R^{27}$, $R^{28}$ and $R^{29}$ are hydrogen or $C_{1-6}$-alkyl, and X is

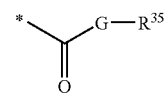

wherein G is —O—; $R^{35}$ is $C_{1-100}$-alkyl, wherein $C_{1-100}$-alkyl can be unsubstituted or substituted with one or more

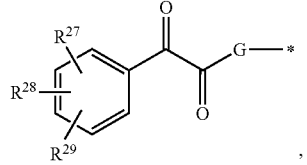

and one or more $CH_2$-groups of $C_{1-100}$-alkyl can be replaced with —O—.

Especially preferred photoinitiators of formula 2 are diethyleneglycol di(phenylglyoxylate), triethyleneglycol di(phenylglyoxylate), polyethylene glycol (150) di(phenylglyoxylate), polyethylene glycol (300) di(phenylglyoxylate), polyethylene glycol (400) di(phenylglyoxylate) and polyethylene glycol (600) di(phenylglyoxylate). Polyethylene glycol (600) di(phenylglyoxylate) is especially preferred.

The photoinitiator can also be a titanocene or combinations of a benzophenone, respectively, thioxanthon-derivative with a coinitiator, for example a tertiary amine. But preferably, the photoinitiator is a compound of formula 2.

The composition can also comprise one ore more quaternary ammonium compound carrying one or more ethylenically unsaturated groups. Usually these compounds have biocidal activity. The quaternary ammonium compounds carrying one or more ethylenically unsaturated groups can be of formula

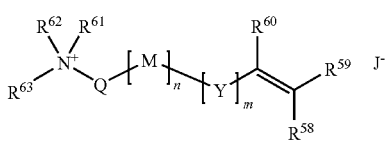

(3)

wherein
$R^{58}$, $R^{59}$ and $R^{60}$ can be the same or different and are hydrogen, halogen or $C_{1-6}$-alkyl,
$R^{61}$, $R^{62}$ and $R^{63}$ can be the same or different and are $C_{1-30}$-alkyl, $C_{2-30}$-alkenyl, $C_{3-8}$-cycloalkyl, aryl, or $R^{61}$ and $R^{62}$ together with the N of the ammonium group form a 4 to 8 membered cycle, wherein one $CH_2$ group of the cycle may be replaced with NH or O, Q and Y can be the same or different and are $C_{1-15}$-alkylene, M is a bridging group, n and m can be the same or different and are 0 or 1, $J^-$ is an anion, wherein $C_{1-30}$-alkyl, $C_{2-30}$-alkenyl, $C_{3-8}$-cycloalkyl or $C_{1-15}$-alkylene can be unsubstituted or substituted with one or more aryl, $OC_{2-6}$-alkenyl, halogen, CN, $C(O)OR^{64}$, $C(O)NR^{65}R^{66}$, $OR^{67}$, $NR^{68}R^{69}$, $NHC(O)C(R^{70})=C(R^{71})R^{72}$, $OC(O)C(R^{73})=C(R^{74})R^{75}$ or $C(O)OC(R^{76})=C(R^{77})R^{78}$;

wherein aryl can be unsubstituted or substituted with one or more $C_{1-6}$-alkyl, $C_{2-6}$-alkenyl, $OC_{2-6}$-alkenyl, halogen, CN, $C(O)OR^{64}$, $C(O)NR^{65}R^{66}$, $OR^{67}$, $NR^{68}R^{69}$, $NHC(O)C(R^{70})=C(R^{71})R^{72}$, $OC(O)C(R^{73})=C(R^{74})R^{75}$ or $C(O)OC(R^{76})=C(R^{77})R^{78}$;

wherein $R^{64}$, $R^{65}$, $R^{66}$, $R^{67}$, $R^{68}$, $R^{69}$, $R^{70}$, $R^{71}$, $R^{72}$, $R^{73}$, $R^{74}$, $R^{75}$, $R^{76}$, $R^{77}$ and $R^{78}$ can be the same or different and are hydrogen or $C_{1-6}$-alkyl, and one or more $CH_2$-groups of $C_{1-15}$-alkylene can be replaced by $N—CH_2—CH=CH_2$, $CH—CH=CH_2$, NH and/or O.

$C_{1-30}$-Alkyl can be branched or unbranched. Examples of $C_{1-30}$-alkyl are methyl, ethyl, propyl, isopropyl, butyl, isobutyl, sec-butyl, tert-butyl, pentyl, hexyl, heptyl, octyl, nonyl, decyl, undecyl, dodecyl, tetradecyl, pentadecyl, hexadecyl, octadecyl, eicosyl, heneicosyl, docosyl, tetracosyl and triacontyl.

Examples of $C_{1-15}$-alkylene are methylene, propylene and butylene.

Examples of bridging groups M are $C_{3-8}$-cycloalkylene, arylene, polymer, OC(O), C(O)O, NH(CO) and C(O)NH. Arylene can be phenylene. An example of a polymer is polyethyleneimine.

$J^-$ can be any anion, for example sulfate, sulfite, carbonate, phosphate or halogenide. Halogenide can be fluoridne, chloride, bromide or iodide.

Examples of quaternary ammonium compounds carrying one or more ethylenically unsaturated group are trimethylaminoethyl acrylate chloride, trimethylaminoethyl methacrylate chloride, trimethylaminotetradecyl acrylate chloride, trimethylaminohexadecyl acrylate chloride, trimethylaminooctadecyl acrylate chloride and diallyldimethylammonium chloride and the compounds of formulae

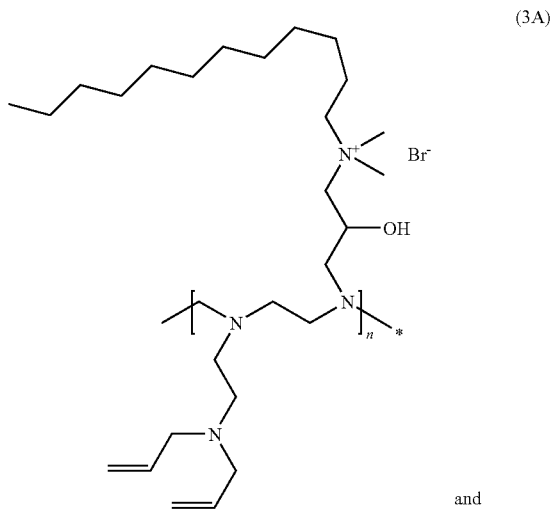

(3A)

and

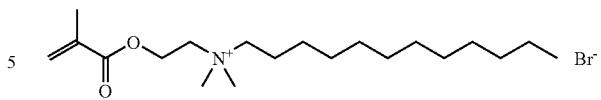

(3B)

More preferred quaternary ammonium compounds carrying one or more ethylenically unsaturated group are of formula

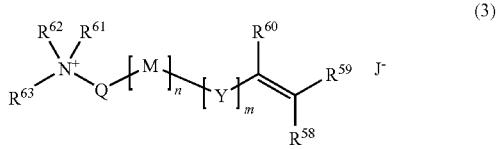

(3)

wherein $R^{58}$, $R^{59}$ and $R^{60}$ can be the same or different and are hydrogen or $C_{1-6}$-alkyl, $R^{61}$, $R^{62}$ and $R^{63}$ can be the same or different and are $C_{1-30}$-alkyl or $C_{2-30}$-alkenyl, Q and Y can be the same or different and are $C_{1-15}$-alkylene, M is a bridging group selected from the group consisting of arylene, polymer, OC(O) and C(O)O, n and m can be the same or different and are 0 or 1, $J^-$ is a halogenide, wherein $C_{1-30}$-alkyl, $C_{2-30}$-alkenyl or $C_{1-15}$-alkylene can be unsubstituted or substituted with one or more $OC_{2-6}$-alkenyl, $C(O)OR^{64}$, $C(O)NR^{65}R^{66}$, $OR^{67}$, $NR^{68}R^{69}$, $NHC(O)C(R^{70})=C(R^{71})R^{72}$, $OC(O)C(R^{73})=C(R^{74})R^{75}$ or $C(O)OC(R^{76})=C(R^{77})R^{78}$;

wherein $R^{64}$, $R^{65}$, $R^{66}$, $R^{67}$, $R^{68}$, $R^{69}$, $R^{70}$, $R^{71}$, $R^{72}$, $R^{73}$, $R^{74}$, $R^{75}$, $R^{76}$, $R^{77}$ and $R^{78}$ can be the same or different and are hydrogen or $C_{1-6}$-alkyl, and one or more $CH_2$-groups of $C_{1-16}$-alkylene can be replaced by $N—CH_2—CH=CH_2$, $CH—CH=CH_2$, NH and/or O.

Most preferred quaternary ammonium compounds carrying one or more ethylenically unsaturated groups are of formula

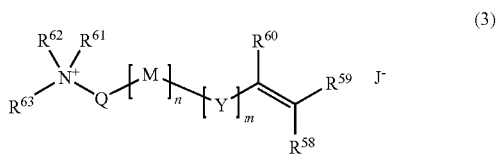

(3)

wherein $R^{58}$, $R^{59}$ and $R^{60}$ can be the same or different and are hydrogen or $C_{1-6}$-alkyl, $R^{61}$, $R^{62}$ and $R^{63}$ can be the same or different and are $C_{1-30}$-alkyl, Q and Y can be the same or different and are $C_{1-6}$-alkylene, M is a bridging group selected from the group consisting of polymer and OC(O), n and m can be the same or different and are 0 or 1, $J^-$ is a halogenide, wherein $C_{1-30}$-alkyl or $C_{1-6}$-alkylene can be unsubstituted or substituted with one or more $OR^{67}$, wherein $R^{67}$ can be hydrogen or $C_{1-6}$-alkyl, and one or more $CH_2$-groups of $C_{1-16}$alkylene can be replaced by $N-CH_2-CH=CH_2$.

Examples of $C_{1-6}$-alkylene are methylene, propylene and butylene.

Compounds 3A and 3B are especially preferred quaternary ammonium compounds carrying one or more ethylenically unsaturated groups.

Compound 3A can be prepared by treating polyethyleneimine with N-3-chloro-2-hydroxypropyl-N-lauryl-dimethylammonium chloride and allyl bromide. Compound 3B can be prepared by reacting N,N-dimethylaminoethyl methacrylate with dodecyl bromide as described in S. M. Hamid and D. C. Sherrington, *Polymer* 1987, 28, 325 to 331.

The composition can also comprise additional components such as biocides, surfactants and de-foamers.

Examples of biocides are 5-chloro-2-(2,4-dichlorophenoxy)phenol, which is sold, for example, under the tradename Ciba® Irgasan® DP300, N'-tert-butyl-N-cyclopropyl-6-(methylthio)-1,3,5-triazine-2,4-diamine, which is sold under the tradename Ciba® Irgarol® 1051, 2-thiazol-4-yl-1H-benzoimidazole, which is sold under the tradename Ciba® Irgaguard® F3000, chlorhexidine, gallic acid, mucobromic acid, itaconic acid and 3-iodo-2-propynyl butyl carbamate, which is sold under the tradename Maguard™ I-100.

Examples of surfactants are anionic surfactants such as sodium dodecyl sulfate or ammonium lauryl sulfate, cationic surfactants such as cetyl trimethylammonium bromide or cetyl pyridinium chloride, amphoteric surfactants such as dodecyl betaine and nonionic surfactants such as copolymers of poly(ethylene oxide) and poly(propylene oxide).

Examples of defoamers are mineral oil preparations such as the defoamer sold under the tradename Ciba® EFKA® 2526 and polyether functionalized polysiloxanes such as the defoamer sold under the tradename Ciba® EFKA® 2550

The composition can comprise 0.001 to 100% by weight of the one or more ethylenically unsaturated compounds based on the weight of the composition. Preferably, it comprises 0.01 to 20% by weight of the one or more ethylenically unsaturated compounds and more preferably 0.1 to 10% by weight.

The composition can comprise 0 to 99.999% by weight of the solvent based on the weight of the composition. Preferably, it comprises 10 to 99.9% by weight of the solvent and more preferably 80 to 99% by weight.

The composition can comprise 0 to 50% by weight of the one or more radical initiators based on the weight of the composition. Preferably, it comprises 0.01 to 20% by weight of the one or more radical initiators and more preferably 0.1 to 10% by weight.

The composition can comprise 0 to 50% by weight of one or more quaternary ammonium compounds carrying one or more ethylenically unsaturated groups based on the weight of the composition. Preferably, it comprises 0.001 to 10% by weight of the quaternary ammonium compounds and more preferably 0.01 to 5% by weight.

The composition can comprise 0 to 50% by weight of additional components based on the weight of the composition. Preferably, it comprises 0.001 to 10% by weight of additional components and more preferably 0.01 to 5% by weight.

Preferably, the weight ratio of one or more ethylenically unsaturated compounds/solvent is in the range from 0.01/100 to 50/100, more preferably from 0.1/100 to 20/100, most preferably from 0.5/100 to 10/100.

Preferably, the molar ratio of one or more ethylenically unsaturated compounds/one or more radical initiators is in the range from 100/1 to 1/100, preferably from 10/ to 1/10, more preferably from 2/1 to 1/2. Most preferably, the one or more ethylenically unsaturated compounds and the one or more radical initiators are used in about equimolar amounts.

The composition can be a solution, an emulsion or dispersion. Preferably, the composition is a solution. The composition can be applied, for example, using a wire bar or by dipping, spraying or spin coating.

Curing of the composition can be achieved by polymerization of the one or more ethylenically unsaturated compounds, and other components, that are capable of polymerization and are optionally present in the composition, for example quaternary ammonium compounds carrying one or more ethylenically unsaturated groups.

If sufficient radicals are present at the oxidized surface of the substrate, the one or more ethylenically unsaturated compounds can polymerize after application without any further treatment. But, usually, the polymerization is initiated by treatment with heat, electron-beam or electromagnetic radiation. Examples of electromagnetic radiation are X-rays, gamma-rays, ultraviolet radiation, infrared radiation, visible light or microwaves. Preferably, the polymerization is initiated by treatment with electromagnetic radiation, more preferably by treatment with ultraviolet radiation. Usually, the ultraviolet radiation is performed at 60 to 300 Watt/cm and a belt speed of 1 to 1000 m/min, preferably 10 to 200 m/min.

Preferably, the polymerization is performed under inert gas atmosphere containing only traces of oxygen. Examples of inert gas are nitrogen, argon, carbon dioxide and helium. Preferably, the amount of oxygen present in the inert gas atmosphere is below 1000 volume ppm, more preferably, it is below 500 volume ppm, and most preferably, it is below 150 volume ppm.

The cured coating layer can have a thickness in the range of from 0.1 to 100 μm, preferably, from 1 to 50 μm.

Biocides can be applied to the surface of the substrate, for example before the oxidation of the surface (before step (i)), after the oxidation of the surface and before applying the composition comprising the ethylenically unsaturated compound (after step (i) and before step (ii)), after applying the composition and before curing (after step (ii) before step (iii)) or after curing the composition (after step (iii)).

The substrate may be coated with additional coating layers, which can be applied to the substrate before or after the coating layer formed by the process of the present invention.

Also part of the invention is a process for coating a substrate, which process comprises the following steps
(i) oxidizing the surface of the substrate
(ii) applying a composition comprising one or more ethylenically unsaturated compounds of formula

(1A)

to the oxidized surface of the substrate,
wherein $R^{79}$, $R^{80}$ and $R^{81}$ can be the same or different and are hydrogen, halogen or $C_{1-6}$-alkyl, and Y is $C(O)-OC_{30-100}$-alkyl, $C(O)-NHC_{30-100}$-alkyl or $O-C_{30-100}$-alkyl, wherein $C(O)-OC_{30-100}$-alkyl, $C(O)-NHC_{30-100}$-alkyl or $O-C_{30-100}$-alkyl can be unsubstituted or substituted with one or more $OC_{2-30}$-alkenyl, $OR^{82}$, $NR^{83}R^{84}$, $OC(O)C(R^{85})=C(R^{86})R^{87}$ and/or $NHC(O)C(R^{88})=C(R^{89})R^{90}$, wherein $R^{82}$, $R^{83}$, $R^{84}$, $R^{85}$, $R^{86}$, $R^{87}$, $R^{88}$, $R^{89}$ and $R^{90}$ can be the same or different and are hydrogen or $C_{1-6}$-alkyl, and wherein one or more $CH_2$-groups of $C(O)$—$OC_{30-100}$-alkyl, $C(O)$—$NHC_{30-100}$-alkyl or $O$—$C_{30-100}$-alkyl can be replaced with —O— and/or —NH—, and (iii) curing the composition in order to form a coating layer.

$C_{30-100}$-alkyl in $C(O)$—$OC_{30-100}$-alkyl, $C(O)$—$NHC_{30-100}$-alkyl and $O$—$C_{30-100}$-alkyl can be branched or unbranched.

Examples of a preferred ethylenically unsaturated compounds of formula 1A are polyethylene glycol (600) diacrylate and polyethyleneglycol (600) dimethacrylate.

In preferred compounds of formula 1A, $R^{79}$, $R^{80}$ and $R^{81}$ can be the same or different and are hydrogen or $C_{1-6}$-alkyl, and Y is $C(O)$—$OC_{30-100}$-alkyl, which can be unsubstituted or substituted with one or more $OC_{2-30}$-alkenyl, $OR^{82}$, $NR^{83}R^{84}$, $OC(O)C(R^{85})$=$C(R^{86})R^{87}$ and/or $NHC(O)C(R^{88})$=$C(R^{89})R^{90}$, wherein $R^{82}$, $R^{83}$, $R^{84}$, $R^{85}$, $R^{86}$, $R^{87}$, $R^{88}$, $R^{89}$ and $R^{90}$ can be the same or different and are hydrogen or $C_{1-6}$-alkyl and wherein one or more $CH_2$-groups of $C(O)$—$OC_{30-100}$-alkyl can be replaced with —O— and/or —NH—.

In more preferred compounds of formula 1A, $R^{79}$, $R^{80}$ and $R^{81}$ can be the same or different and are hydrogen or $C_{1-6}$-alkyl, and Y is $C(O)$—$OC_{30-60}$-alkyl, which can be unsubstituted or substituted with one or more $OC(O)C(R^{85})$=$C(R^{86})R^{87}$, and wherein one or more $CH_2$-groups of $C(O)$—$OC_{30-60}$-alkyl can be replaced with —O—.

$C_{30-60}$-alkyl in $C(O)$—$OC_{30-60}$-alkyl can be branched or unbranched.

Particularly preferred compounds of formula 1A are polyethylene glycol (600) diacrylate and polyethyleneglycol (600) dimethacrylate.

The definition of the substrate is as defined above. The oxidation of the surface, the application of the composition and the curing of the composition are also as defined above.

Also part of the present invention is a substrate obtainable by the latter process.

Also part of the present invention is a mixture of one or more ethylenically unsaturated compounds of formula

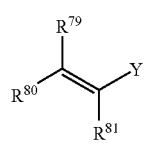

(1A)

wherein $R^{79}$, $R^{80}$ and $R^{81}$ can be the same or different and are hydrogen, halogen or $C_{1-6}$-alkyl, and Y is $C(O)$—$OC_{30-100}$-alkyl, $C(O)$—$NHC_{30-100}$-alkyl or $O$—$C_{30-100}$-alkyl, wherein $C(O)$—$OC_{30-100}$-alkyl, $C(O)$—$NHC_{30-100}$-alkyl or $O$—$C_{30-100}$-alkyl can be unsubstituted or substituted with one or more $OC_{2-30}$-alkenyl, $OR^{82}$, $NR^{83}R^{84}$, $OC(O)C(R^{85})$=$C(R^{86})R^{87}$ and/or $NHC(O)C(R^{88})$=$C(R^{89})R^{90}$, wherein $R^{82}$, $R^{83}$, $R^{84}$, $R^{85}$, $R^{86}$, $R^{87}$, $R^{88}$, $R^{89}$ and $R^{90}$ can be the same or different and are hydrogen or $C_{1-6}$-alkyl, and wherein one or more $CH_2$-groups of $C(O)$—$OC_{30-100}$-alkyl, $C(O)$—$NHC_{30-100}$-alkyl or $O$—$C_{30-100}$-alkyl can be replaced with —O— and/or —NH—, and one or more radical photoinitiators of formula

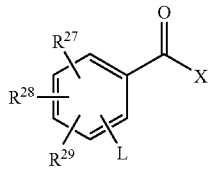

(2)

wherein

L can be hydrogen or

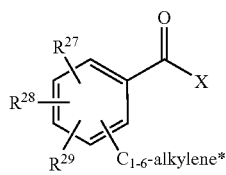

wherein $C_{1-6}$-alkylene can be unsubstituted or substituted with hydroxyl, and $R^{27}$, $R^{28}$ and $R^{29}$ can be the same or different and can be hydrogen, halogen, hydroxyl, $C_{1-6}$-alkyl, aryl, $O$—$C_{1-6}$-alkyl, $O$-aryl, $S$—$C_{1-6}$-alkyl, $S$-aryl or $NR^{30}R^{31}$, wherein $R^{30}$ and $R^{31}$ can be the same or different and can be hydrogen or $C_{1-6}$-alkyl, or together with the nitrogen form a five to seven membered cycle, wherein a $CH_2$ group of the cycle can be replaced with —O—, and $C_{1-6}$-alkyl, $O$—$C_{1-6}$-alkyl and $S$—$C_{1-6}$-alkyl can be unsubstituted or substituted with one or more hydroxyl, $C_{2-30}$-alkenyl, $OC(O)C_{2-30}$-alkenyl or aryl, and X can be

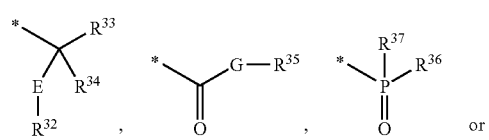

or

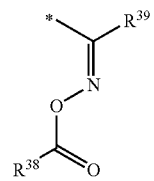

wherein E and G can be —O—, —S— or $NR^{40}$, wherein $R^{40}$ can be hydrogen or $C_{1-6}$-alkyl, or $R^{40}$ and $R^{32}$, respectively, $R^{35}$ can, together with the nitrogen, form a five to seven membered cycle, wherein a $CH_2$ group of the cycle can be replaced with —O—, NH, $NC(O)C(R^{41})$=$C(R^{42})R^{43}$ and/or

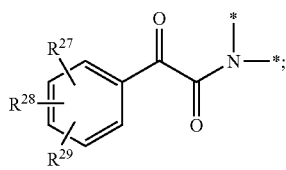

$R^{32}$, $R^{35}$ and $R^{39}$ can be the same or different and can be hydrogen, $C_{1-100}$-alkyl, $C_{3-8}$-cycloalkyl, $C_{2-30}$-alkenyl, aryl or $C(O)R^{44}$, $R^{36}$, $R^{37}$ and $R^{38}$ can be the same or different and can be hydrogen, $C_{1-100}$-alkyl, $O-C_{1-100}$-alkyl, $S-C_{1-100}$-alkyl, $NR^{45}C_{1-100}$-alkyl, $C_{3-8}$-cycloalkyl, $C_{2-30}$-alkenyl, aryl or $C(O)R^{44}$, wherein $R^{45}$ can have the same meaning as $R^{32}$ and $R^{44}$ can have the same meaning as $R^{36}$, $R^{33}$ and $R^{34}$ can have the same meaning as $R^{36}$ and in addition can, together with the linking carbon atom, form a five to seven membered cycle, $C_{1-100}$-alkyl and $C_{2-30}$-alkenyl can be unsubstituted or substituted with one or more $C_{3-8}$-cycloalkyl, aryl, halogen, amino, hydroxyl, CN, COOH, $C(O)R^{46}$, $C(O)OR^{47}$, $C(O)NR^{48}R^{49}$, $OR^{50}$, $OC(O)R^{51}$, $OC(O)C(R^{52})=C(R^{53})R^{54}$, $C(O)OC(R^{55})=C(R^{56})R^{57}$,

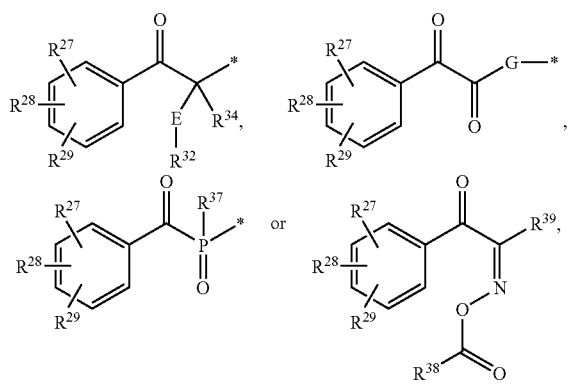

aryl can be unsubstituted or substituted with one or more $C_{1-4}$-alkyl, $C_{3-8}$-cycloalkyl, $C_{2-30}$-alkenyl, halogen, hydroxyl, CN, COOH, $C(O)R^{46}$, $C(O)OR^{47}$, $C(O)NR^{48}R^{49}$, $OR^{50}$, $OC(O)R^{51}$, $OC(O)C(R^{52})=C(R^{53})R^{54}$ or $C(O)OC(R^{55})=C(R^{56})R^{57}$;

wherein $R^{41}$, $R^{42}$, $R^{43}$, $R^{46}$, $R^{47}$, $R^{48}$, $R^{49}$, $R^{50}$, $R^{51}$, $R^{52}$, $R^{53}$, $R^{54}$, $R^{55}$, $R^{56}$ and $R^{57}$ can be the same or different and can be hydrogen or $C_{1-6}$-alkyl, and one or more $CH_2$-groups of $C_{1-100}$-alkyl or $C_{2-30}$-alkenyl can be replaced with $-O-$, $-NR^{40}-$ and/or phenylene, and one $CH_2$-group of $C_{3-8}$-cycloalkyl can be replaced with $-O-$.

The preferences given above for the ethylenically unsaturated compounds of formula 1A and the photoinitiators 2 apply also here.

The processes of the present invention have the advantage in that they provide substrates coated with a coating layer, whereto biological materials show a decreased adhesion. These coated substrates show an increased resistance towards biological materials and thus render an additional treatment with biocides, which can be based on heavy metals and can also be highly toxic, obsolete. Another advantage of the process of the present invention is that it is possible to easily coat substrates with coatings showing a decreased adhesion to biological material on existing printing equipment in a large volume continuous process.

EXAMPLES

Example 1

A biaxially orientated polypropylene (BOPP) film of 50 μm width supplied by ExxonMobil Chemical Company is subjected on both sides to corona pre-treatment using one ceramic electrode at a distance of 0.8 mm to the BOPP film and a corona discharge of 1×600 W at a belt speed of 3 m/min. Then, a 1% by weight solution of polyethylene glycol (600) diacrylate (1B), sold as SR-610 by Sartomer Company, in isopropanol is applied to both sides of the BOPP film using a 4 μm wire bar. The treated BOPP film is stored until the isopropanol has evaporated. The dry treated BOPP film is irradiated under nitrogen atmosphere containing about 500 ppm oxygen using a UV processor with a medium pressure mercury lamp having an output of 120 W/cm at a belt speed of 50 m/min and a dichroic reflector.

(1B)

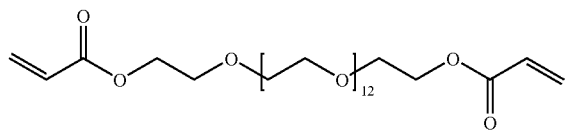

Example 2

The process of example 1 is repeated, except that instead of the 1% by weight solution of 1B, a 1% by weight solution of an equimolar mixture of 1B and polyethylene glycol (600) di(phenylglyoxylate) (2A), which is prepared as described in example 3 of WO 06/067061, is used.

(2A)

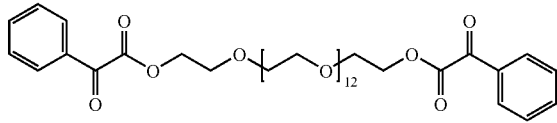

Example 3

The process of example 2 is repeated, except that instead of a 4 μm wire bare, a 12 μm wire bar is used.

Example 4

The process of example 2 is repeated, except that instead of the 1% by weight solution of the equimolar mixture of 1B and 2A, a 1% by weight solution of 90% by weight of the equimolar mixture of 1B and 2A (based an the total weight of 1B, 2A and 3A) and 10% by weight of biocide 3A (based on the total weight of 1 B, 2A and 3A), in isopropanol is used.

(3A)

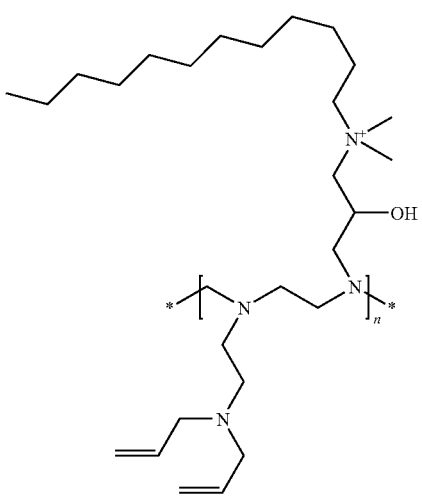

Compound 3A is prepared as follows: N-3-chloro-2-hydroxypropyl-N-lauryl-dimethylammonium chloride (10.35 g) and potassium hydroxide (1.71 g) in ethanol (60 g) are added to a solution of polyethyleneimine (5 g) and the mixture is heated at 80° C. under nitrogen for 29 hours. Allyl bromide (5.63 g) and potassium hydroxide (2.6 g) are added and the mixture is stirred at reflux for 6 hours. The reaction mixture is cooled, filtered and concentrated to give an opaque light yellow syrup. After drying in vacuum over 22 hours, 8.6 g of compound 3A are obtained. The polyamine, dodecyl and allyl moieties can be identified by NMR. Approximately one allyl moiety is present for every dodecyl moiety and there is about one dodecyl moiety and one allyl moiety for every nine ethyleneamino moieties present.

Example 5

The process of example 4 is repeated, except that instead of the 1% by weight solution of 90% by weight of the equimolar mixture of 1B and 2A (based an the total weight of 1B, 2A and 3A) and 10% by weight of 3A (based on the total weight of 1 B, 2A and 3A), a 1% by weight solution of 90% by weight of the equimolar mixture of 1B and 2A (based an the total weight of 1B, 2A and 3B) and 10% by weight of 3B (based on the total weight of 1B, 2A and 3B) in isopropanol is used. 3B is prepared as described in S. M. Hamid and D. C. Sherrington, Polymer 1987, 28, 325 to 331.

(3B)

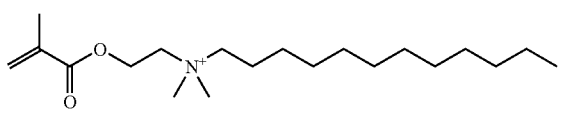

$^1$HNMR (300 MHz, CDCl$_3$): 0.87 (t, 3H, alkyl terminal CH$_3$), 1.24 to 1.33 (m, 18H, alkyl CH$_2$), 1.7 (m, 2H, N—CH$_2$CH$_2$), 1.95 (s, 3H, allylic CH$_3$), 3.49 (s, 6H, N (CH$_3$)$_2$), 3.6 (m, 2H, NCH$_2$), 4.16 (m, 2H, O—CH$_2$), 4.64, (m, 2H, O—CH$_2$CH$_2$), 5.67, (s, 1H, cis vinylic H), 6.14 (s, 1H, trans vinylic H).

Example 6

A biaxially orientated polypropylene (BOPP) film of 50 μm width supplied by ExxonMobil Chemical Company is subjected on both sides to corona pre-treatment using two ceramic electrodes (15,000 V, 500 mA, 10 to 40 kHz) at a distance of 1.5 mm to the BOPP film and a corona discharge of 3×700 W at a belt speed of 50 m/min. Then, a 1% by weight solution of an equimolar mixture of 1B and 2A in isopropanol is applied to both sides of the BOPP film using a 4 μm big wire bar. The treated BOPP film is stored until the isopropanol has evaporated. The dry treated BOPP film is irradiated under nitrogen atmosphere containing about 500 ppm oxygen using a UV processor with a medium pressure mercury lamp having an output of 80 W/cm at a belt speed of 50 m/min and a dichroic reflector.

Example 7

The process of example 6 is repeated, except that instead of a UV processor with a medium pressure mercury lamp having an output of 80 W/cm, a UV processor with a medium pressure mercury lamp having an output of 120 W/cm is used.

Example 8

The process of example 6 is repeated, except that instead of 1% by weight solution of an equimolar mixture of 1B and 2A, a 10% by weight solution of an equimolar mixture of 1B and 2A is used.

Example 9

The process of example 8 is repeated, except that instead of a UV processor with a medium pressure mercury lamp having an output of 80 W/cm, a UV processor with a medium pressure mercury lamp having an output of 120 W/cm is used.

Example 10

The process of example 8 is repeated, except that instead of a UV processor with a medium pressure mercury lamp having an output of 80 W/cm, a UV processor with a medium pressure mercury lamp having an output of 200 W/cm is used.

Example 11

A biaxially orientated polypropylene (BOPP) film of 50 μm width supplied by ExxonMobil Chemical Company is subjected on both sides to corona pre-treatment using two ceramic electrodes (15,000 V, 500 mA, 10 to 40 kHz) at a distance of 1.5 mm to the BOPP film and a corona discharge of 3×700 W at a belt speed of 50 m/min. Then, a 1% by weight solution of an equimolar mixture of 1B and 2A in isopropanol is applied to both sides of the BOPP film by spraying using a spray bottle. The treated BOPP film is stored until the isopropanol has evaporated. The dry treated BOPP film is irradiated under nitrogen atmosphere containing about 70 to 80 ppm oxygen using a UV processor with a medium pressure mercury lamp having an output of 120 W/cm at a belt speed of 50 m/min and a dichroic reflector.

Example 12

The process of example 11 is repeated, except that the 1% by weight solution of the equimolar mixture of 1B and 2A is applied by dipping instead of spraying.

Example 13

The process of example 11 is repeated, except that a 3% by weight solution of the equimolar mixture of 1B and 2A in isopropanol is used instead of a 1% by weight solution.

Example 14

The process of example 12 is repeated, except that a 3% by weight solution of the equimolar mixture of 1B and 2A in isopropanol is used instead of a 1% by weight solution.

Example 15

The process of example 11 is repeated, except that a 6% by weight solution of the equimolar mixture of 1B and 2A in isopropanol is used instead of a 1% by weight solution.

Example 16

The process of example 12 is repeated, except that a 6% by weight solution of the equimolar mixture of 1B and 2A in isopropanol is used instead of a 1% by weight solution.

Testing the Adhesion of Bacterial Cells on the Treated BOPP Films of Examples 1 to 16

One side of the treated BOPP films obtained in example 1 to 16 is attached to a glass slide by a sticky tape. A polymeric gasket is placed upon the other side of the treated BOPP film. 100 µl HEPES buffer (150 mM, pH=7.4) and then 400 µl of a solution containing ca. $10^9$ cells/mL of *Escherichia coli* K12 (obtained from Professor Sokurenko, University of Washington, Seattle, Wash. 98195, USA) are added to the gasket. After an incubation at 37° C. for 20 min, the bacterial cells not adhered to the treated BOPP film are washed away with HEPES buffer (10×300 µl). The BOPP films are imaged and the number of bacterial cells adhered to the surface of the treated BOPP films is counted.

The same procedure is also repeated with untreated BOPP film (comparative example 1) and BOPP film corona pre-treated using one ceramic electrode at a distance of 0.8 mm to the BOPP film and a corona discharge of 1×600 W at a belt speed of 3 m/min (comparative example 2), respectively BOPP film corona pre-treated using two ceramic electrode at a distance of 1.5 mm to the BOPP film and a corona discharge of 3×700 W at a belt speed of 50 m/min (comparative example 3). The number of bacterial cells adhered to the untreated BOPP film corresponds to an adhesion of bacterial cells of 100%. The results are outlined in table 1 below:

TABLE 1

| Example No | Conditions | Adhesion of Bacterial Cells [%] |
|---|---|---|
| comp. ex. 1 | Untreated BOPP film | 100 |
| Series A: Oxidation: Corona treatment, 1 electrode, 0.8 mm distance, 1 × 600 Watt, 3 m/min, Curing: UV irradiation, nitrogen atmosphere (about 500 ppm $O_2$), 120 W | | |
| comp. ex. 2 | Only Corona treatment | 46 |
| 1 | 1 w % 1B, 4 µm wire bar, | 7 |
| 2 | 1 w % (50/50 (mol/mol) 1B/2A), 4 µm bar, | 5 |
| 3 | 1 w % (50/50 (mol/mol) 1B/2A), 12 µm bar, | 3 |
| 4 | 1 w % (90 w % (50/50 (mol/mol) 1B/2A) + 10 w % 3A), 4 µm wire bar | 2 |
| 5 | 1 w % (90 w % (50/50 (mol/mol) 1B/2A) + 10 w % 3B), 4 µm wire bar | 7 |
| Series B: Oxidation: Corona treatment, 2 electrodes, 1.5 mm distance, 3 × 700 Watt, 50 m/min Curing: UV irradiation, nitrogen atmosphere (about 500 ppm $O_2$), different UV doses | | |
| comp. ex. 3 | Only Corona Treatment | 17 |
| 6 | 1 w % (50/50 (mol/mol) 1B/2A), 4 µm wire bar, 80 W | 2 |
| 7 | 1 w % (50/50 (mol/mol) 1B/2A), 4 µm wire bar, 120 W | 6 |
| 8 | 10 w % (50/50 (mol/mol) 1B/2A), 4 µm wire bar, 80 W | 3 |
| 9 | 10 w % (50/50 (mol/mol) 1B/2A), 4 µm wire bar, 120 W | 5 |
| 10 | 10 w % (50/50 (mol/mol) 1B/2A), 4 µm wire bar, 200 W | 1 |
| Series C: Oxidation: Corona treatment: 2 electrodes, 1.5 mm distance, 3 × 700 Watt, 50 m/min Curing: UV irradiation, nitrogen atmosphere (about 80 ppm $O_2$), 120 W | | |
| comp. ex. 3 | Only Corona Treatment | 17 |
| 11 | 1 w % (50/50 (mol/mol) 1B/2A), spraying | 3.5 |
| 12 | 1 w % (50/50 (mol/mol) 1B/2A), dipping | 0.4 |
| 13 | 3 w % (50/50 (mol/mol) 1B/2A), spraying | 1 |
| 14 | 3 w % (50/50 (mol/mol) 1B/2A), dipping | 0.4 |
| 15 | 6 w % (50/50 (mol/mol) 1B/2A), spraying | 0.5 |
| 16 | 6 w % (50/50 (mol/mol) 1B/2A), dipping | 0.4 |

The BOPP films of series C are also stored a) in distilled water for three weeks and b) in a garden (exposed to outside conditions such as sun, wind and rain) in Frick/Switzerland in February 2007 for three weeks before imaging.

The results are outlined in table 2 below:

TABLE 2

| Example No | Conditions | Adhesion of Bacterial Cells [%] | |
|---|---|---|---|
| | | Stored in Water | Stored in Garden |
| Series C: Oxidation: Corona treatment, 2 electrodes, 1.5 mm distance, 3 × 700 Watt, 50 m/min Curing: UV irradiation, nitrogen atmosphere (about 80 ppm $O_2$), 120 W | | | |
| comp. ex. 3 | Only Corona Treatment | 30 | nd[a] |
| 11 | 1 w % (50/50 (mol/mol) 1B/2A), spraying | 0.7 | 2.5 |
| 12 | 1 w % (50/50 (mol/mol) 1B/2A), dipping | 11 | 1.8 |
| 13 | 3 w % (50/50 (mol/mol) 1B/2A), spraying | 1.7 | 1.5 |
| 14 | 3 w % (50/50 (mol/mol) 1B/2A), dipping | 0.4 | 1.0 |
| 15 | 6 w % (50/50 (mol/mol) 1B/2A), spraying | 0.5 | 1.0 |
| 16 | 6 w % (50/50 (mol/mol) 1B/2A), dipping | 1.4 | 0.9 |

[a] not determined.

Example 17

A polyethylene terephthalate (PET) foil of 250 μm width supplied by Klockner Pentaplast GMBH is treated with $O_2$ plasma for 10 seconds. Then, a 3% by weight solution of a 60/40 (mol/mol) mixture of polyethylene glycol (600) diacrylate (1B) sold as SR-610 by Sartomer Company and polyethylene glycol (600) di(phenylglyoxylate) (2A) which is prepared as described in example 3 of WO 06/067061 in isopropanol is applied to one side of the PET foil by spin coating (1000 rpm). The treated PET foil is stored until the isopropanol has evaporated. The dry treated PET foil is UV-irradiated under nitrogen atmosphere containing about 20 ppm oxygen for 5 minutes using a 350 W pressure mercury lamp and a 320 nm filter. The obtained coating layer has a thickness of 100 nm and is stable upon washing with water or soap solution for 20 minutes.

Example 18

The process of example 17 is repeated, except that instead of the 3% by weight solution of a 60/40 (mol/mol) mixture of 1B and 2A in isopropanol, a 3% by weight solution of a 2/10/88 (mol/mol/mol) mixture of 1B, 2A and monomethoxylated methacrylate of formula 1C sold as Sartomer CD-552 by Sartomer Company in ethanol is used.

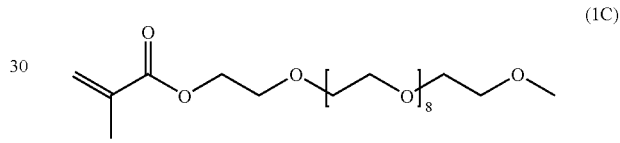

(1C)

Example 19

The process of example 18 is repeated, except that instead of the 3% by weight solution of a 2/10/88 (mol/mol/mol) mixture of 1B, 2A and 1C, a 6% by weight solution of a 2/10/88 (mol/mol/mol) mixture of 1B, 2A and 1C is used.

Testing the Adhesion of Bacterial Cells on the Treated PET Foils of Examples 17 to 19

The adhesion of bacterial cells on the treated PET foils of examples 17 to 19 is tested in analogy to the treated BOPP films of examples 1 to 16, which is described above. The results are outlined in table 3 below:

TABLE 3

| Example No | Conditions | Adhesion of Bacterial Cells [%] |
|---|---|---|
| comp. ex. 4 | Untreated PET foil | 100 |
| Series D: Oxidation: $O_2$ Plasma treatment, 10 seconds, Curing: UV irradiation, nitrogen atmosphere (about 20 ppm $O_2$), 350 W | | |
| 17 | 3 w % (60/40 (mol/mol) 1B/2A), spin coating | 0.5 |
| 18 | 3 w % (2/10/88 (mol/mol/mol) 1B/2A/1C), spin coating | 1 |
| 19 | 6 w % (2/10/88 (mol/mol/mol) 1B/2A/1C), spin coating | 0.01 |

The invention claimed is:

1. A process for imparting decreased adhesion of biological material to the surface of a substrate to form a treated substrate which process comprises the following steps
(i) oxidizing the surface of the substrate
(ii) applying a composition comprising one or more ethylenically unsaturated compounds to the oxidized surface of the substrate and
one or more photoinitiators
and
(iii) curing the composition in order to form a coating layer, wherein the decrease in adhesion of biological material to the surface of the substrate can be determined by comparing the amount of biological material adhered to the surface of the treated substrate and the biological material adhered to the surface of the untreated substrate
wherein the one or more ethylenically unsaturated compounds are of formula

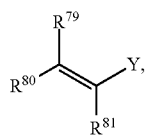
(1A)

wherein $R^{79}$, $R^{80}$ and $R^{81}$ can be the same or different and are hydrogen or $C_{1-6}$-alkyl, and Y is $C(O)$—$OC_{30-100}$-alkyl, wherein $C(O)$—$OC_{30-100}$-alkyl, is substituted with one or more $OC(O)C(R^{85})$=$C(R^{86})R^{87}$, wherein $R^{85}$, $R^{86}$, and $R^{87}$ can be the same or different and are hydrogen or $C_{1-6}$-alkyl, and one or more $CH_2$-groups of $C(O)$—$OC_{30-100}$-alkyl, is replaced with —O—,
wherein the one or more photoinitiators are of formula

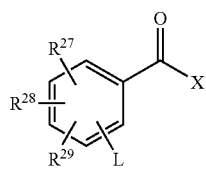
(2)

wherein
L is hydrogen or

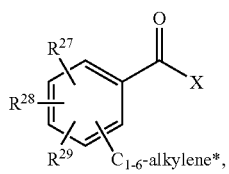

$R^{27}$, $R^{28}$ and $R^{29}$ are hydrogen or $C_{1-6}$-alkyl, and X is

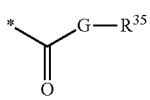

G is —O—;
$R^{35}$ is $C_{1-100}$-alkyl, wherein $C_{1-100}$-alkyl can be unsubstituted or substituted with one or more

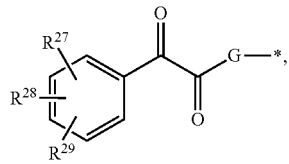

and
one or more $CH_2$-groups of $C_{1-100}$-alkyl is replaced with —O— and the molar ratio of formula (1A) to (2) ranges from 10/1 to 1/10.

2. The process of claim 1, wherein the composition also comprises a solvent.

3. The process of claim 1, wherein the composition also comprises more than one radical initiators.

4. The process of claim 1, proviso that the ethylenically unsaturated compound can not be a nanoparticle carrying ethylenically unsaturated groups.

5. The process of claim 1, wherein the composition also comprises one more quaternary ammonium compounds carrying one or more ethylenically unsaturated groups.

6. The process of claim 1, wherein one or more biocides are applied to the surface of the substrate before step (i), after step (i) and before step (ii), after step (ii) before step (iii), or after step (iii).

7. The process of claim 6, wherein the substrate is coated with additional coating layers.

8. The process of claim 1, wherein the substrate is coated with additional coating layers.

9. The process according to claim 1 wherein the photoinitiator is selected from the group consisting of diethyleneglycol di(phenylglyoxylate), triethyleneglycol di(phenylglyoxylate), polyethylene glycol (150) di(phenylglyoxylate), polyethylene glycol (300) di(phenylglyoxylate), polyethylene glycol (400) di(phenylglyoxylate) and polyethylene glycol (600) di(phenylglyoxylate).

10. The process according to claim 1, wherein the molar ratio of (1A) to (2) ranges from 1:2 to 2:1.

11. A process for coating a substrate, which process comprises the following steps
(i) oxidizing the surface of the substrate
(ii) applying a composition comprising one or more ethylenically unsaturated compounds of formula

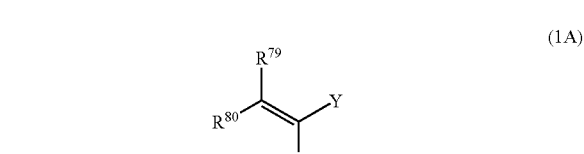
(1A)

to the oxidized surface of the substrate,
wherein $R^{79}$, $R^{80}$ and $R^{81}$ can be the same or different and are hydrogen, halogen or $C_{1-6}$-alkyl, and Y is $C(O)$—$OC_{30-100}$-alkyl, wherein $C(O)$—$OC_{30-100}$-alkyl, is substituted with one or more $OC(O)C(R^{85})$=$C(R^{86})R^{87}$, wherein $R^{85}$, $R^{86}$, and $R^{87}$ can be the same or different and are hydrogen or $C_{1-6}$-alkyl, and wherein one or more $CH_2$-groups of $C(O)$—$OC_{30-100}$-alkyl is replaced with —O— and/or —NH—, and one or more photoinitiators are of formula

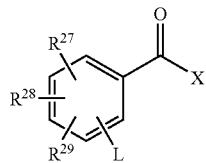

wherein
L is hydrogen or

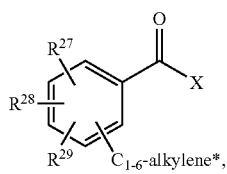

$R^{27}$, $R^{28}$ and $R^{29}$ are hydrogen or $C_{1-6}$-alkyl, and
X is

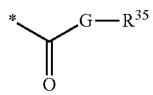

(2)

G is —O—;
$R^{35}$ is $C_{1-100}$-alkyl, wherein $C_{1-100}$-alkyl can be unsubstituted or substituted with one or more

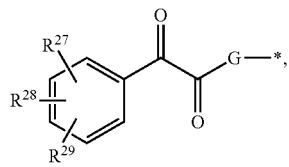

and
one or more $CH_2$-groups of $C_{1-100}$-alkyl is replaced with —O— and the molar ratio of formula (1A) to (2) ranges from 10/1 to 1/10,
(iii) curing the composition in order to form a coating layer.

12. The process of claim 11, wherein the composition also comprises one or more quaternary ammonium compound carrying one or more ethylenically unsaturated groups.

13. The process of claim 11, wherein one or more biocides are applied to the surface of the substrate before step (i), after step (i) and before step (ii), after step (ii) before step (iii), or after step (iii).

* * * * *